US007699750B2

(12) United States Patent
Mertinkat et al.

(10) Patent No.: US 7,699,750 B2
(45) Date of Patent: Apr. 20, 2010

(54) METHOD FOR CONTROLLING A MANUAL TRANSMISSION IN THE EVENT OF A DISORDERLY ENGINE BEHAVIOR

(75) Inventors: Reinhard Mertinkat, Mittelbiberach (DE); Rainer Petzold, Friedrichsafen (DE); Andreas Wolf, Ravensburg (DE); Gerd Sauermann, Markdorf (DE); Klaus Hensinger, Friedrichshafen (DE); Wolfgang Gröner, Friedrichshafen (DE); Ulrich Reith, Schlier (DE)

(73) Assignee: ZF Friedrichshafen AG, Friedrichshafen (DE)

(*) Notice: Subject to any disclaimer, the term of this patent is extended or adjusted under 35 U.S.C. 154(b) by 396 days.

(21) Appl. No.: 11/813,889

(22) PCT Filed: Dec. 2, 2005

(86) PCT No.: PCT/EP2005/012914

§ 371 (c)(1),
(2), (4) Date: Jul. 13, 2007

(87) PCT Pub. No.: WO2006/074758

PCT Pub. Date: Jul. 20, 2006

(65) Prior Publication Data

US 2008/0227601 A1  Sep. 18, 2008

(30) Foreign Application Priority Data

Jan. 13, 2005  (DE) .................. 10 2005 001 505

(51) Int. Cl.
*F16H 61/00* (2006.01)
*F16H 61/16* (2006.01)
*F16H 61/18* (2006.01)
*G06F 7/00* (2006.01)
*G06F 17/00* (2006.01)

(52) U.S. Cl. .............. 477/174; 477/116; 477/125; 701/56; 701/62; 701/66

(58) Field of Classification Search ............... 477/115, 477/116, 125; 701/51, 55, 56, 62, 66
See application file for complete search history.

(56) References Cited

U.S. PATENT DOCUMENTS

| 5,609,548 | A  | * | 3/1997  | White et al. ............ 477/124 |
| 6,319,170 | B1 |   | 11/2001 | Hubbard et al. |
| 7,086,988 | B2 | * | 8/2006  | Fett et al. .............. 477/109 |
| 7,300,381 | B2 | * | 11/2007 | Badillo et al. ........... 477/102 |
| 2006/0030452 | A1 | * | 2/2006 | Tsukada et al. .......... 477/37 |
| 2006/0047395 | A1 | * | 3/2006 | Ikeya et al. ............. 701/51 |
| 2006/0142918 | A1 |   | 6/2006 | Guggolz et al. |

FOREIGN PATENT DOCUMENTS

| DE | 40 12 595 A1 | 10/1991 |
| DE | 101 55 462 A1 | 6/2002 |
| DE | 101 22 158 A1 | 11/2002 |
| DE | 102 38 104 A1 | 3/2004 |
| DE | 102 43 495 A1 | 3/2004 |
| GB | 2 243 655 A | 11/1991 |
| WO | WO 2004041581 A1 * | 5/2004 |

* cited by examiner

*Primary Examiner*—Tisha D Lewis
(74) *Attorney, Agent, or Firm*—Davis & Bujold, P.L.L.C.

(57) ABSTRACT

A method for controlling a partially unsynchronized manual transmission, which realizes the increase of a rotational speed of a transmission part to be synchronized during a gear change procedure by connecting one element of the transmission, via a shiftable clutch, to a drive motor and by making available to this drive motor the required rotational speed as well as the necessary torque at its output shaft. It is also provided that when the rotational speed and/or the torque made available by the drive motor is not sufficient to ensure the synchronization of the manual transmission within a fixed time period, a shifting strategy is pursued, which prevents an unintentional holding of the manual transmission in its neutral position or idle position.

7 Claims, No Drawings

METHOD FOR CONTROLLING A MANUAL TRANSMISSION IN THE EVENT OF A DISORDERLY ENGINE BEHAVIOR

This application is a national stage completion of PCT/EP2005/012914 filed Dec. 2, 2005, which claims priority from German Application Serial No. 10 2005 001 505.0 filed Jan. 13, 2005.

FIELD OF THE INVENTION

The invention concerns a method for controlling an entirely or partially unsynchronized manual transmission with unstable behavior of a drive motor.

BACKGROUND OF THE INVENTION

Manual transmissions have been used for a very long time in different type of motor vehicles. Since, particularly, piston driven internal combustion engines have relatively limited useful rotational speed ratios, the manual transmission is charged with the task of adapting the rotational speed ratio between the output shaft of such a drive motor and the rotational speed of the driven wheels, such that the drive motor can be operated within a desired rotational speed range. For this purpose, like the so-called continuously variable transmissions, which allow the setting of any desired transmission ratios, they are mainly used in step-by-step variable speed transmissions. These transmissions are characterized by a number of discrete gears with respectively different gear transmission ratios.

When changing a gear and also when engaging a gear speed from idle, the participating mechanical components, such as shafts and/or gear wheels, are initially slowed or accelerated to an approximately synchronous rotational velocity. For this purpose, when a clutch or driving clutch, between the drive motor and the transmission, is disengaged, the transmission is brought initially into the neutral position if a gear is previously engaged. The same as the components, which are to be brought into an active connection, are accelerated or slowed approximately to the synchronous speed.

Since the rotational speed of the transmission output is generally closely associated to the rotational velocity of the vehicle wheels, the rotational speed of the transmission input must be selected in correspondence with the rotational speed of the transmission output, taking into consideration the gear ratio of the engaged gear. While the slowing of a respective transmission shaft is generally achieved by way of brakes arranged inside or outside of the transmission, acceleration can be achieved within the transmission, via special synchronizing mechanisms, which are independent from the drive motor, but which are still quite complex.

Acceleration of transmission components of the transmission input can be achieved, however, in a particularly simple way by way of the drive motor itself. For this purpose, starting from the neutral position of the transmission, the driving clutch is engaged at least so far that a sufficiently great torque can be transmitted by the drive motor to the transmission input shaft.

The engine rotational speed is controlled such that the transmission input shaft is accelerated according to the specification. Therein, the driving clutch can be engaged in a rotationally fixed manner and the transmission input rotational speed can be set by way of the engine control of the drive motor. It is basically also possible that the engine rotational speed has a higher value than that set for the rotational speed required for transmission synchronization and that the actual synchronization of the shaft rotational speeds is carried out, via a corresponding control of the driving clutch and/or a braking mechanism. It is important here that the rotational speed of the drive motor is at least correspondingly high to increase the rotational speed of the transmission parts by way of synchronization and that the necessary kinetic energy is made available to the latter.

In at least partially unsynchronized transmissions such as these, it is possible that the drive motor is unable to provide the required rotational speed and/or sufficient torque for synchronization of the transmission to allow the desired gear to be engaged. The possible reasons for this are many and do not need to be further discussed at this point.

In a case such as this, engagement of the desired gear is not possible, because the corresponding transmission parts cannot be accelerated. With this, the transmission remains in a neutral position or it is incumbent upon a driver to select a gear, which can be engaged, via slowing of the transmission parts, to be synchronized, when this unexpected situation arises.

At this point, since the transmission input is separated from the drive motor, its rotational speed diminishes very quickly and only a short time span is left for the driver to attempt a shift such as this. From the driver's point of view, concerning a motor vehicle with an automatically shifting transmission, the transmission engages therein, without detectable reason, into the neutral position and the drive motor runs irregularly with a very low rotational speed or even stops. In such an operation case, a driver with a manually shiftable transmission experiences that when a gear change is required, the transmission shifts into idle and the engine displays the already described behavior.

In this situation, an average driver will hardly be able to identify and manually select a gear into which he can still shift so that when this happens the vehicle can normally coast with the transmission in the neutral position.

In specific malfunctions of the drive motor, it would indeed be possible to at least still drive for a short distance with the vehicle and reach the nearest highway exit ramp, a shop or at least get out of a dangerous situation, such as a highway entry ramp, even if the transmission would remain in the neutral position during the change of gear to a lower gear, because of the unavailable rotational speed increase or the insufficient available torque of the drive motor.

In addition, there are situations in which the defective state of the drive motor is present only for a short time so that driving can be initially continued, when it is possible to support the drive motor for a specific time by supplying kinetic energy from the vehicle wheels, via the manual transmission and the clutch.

Based on these circumstances, it is an object of the invention to present a method for controlling an at least partially unsynchronized manual transmission, which also prevents unintentionally holding the transmission in the neutral position, when the drive motor is unable to provide the rotational speed available with a sufficient torque, which is required for synchronization of the transmission.

SUMMARY OF THE INVENTION

The invention is based on the knowledge that an unintentional delay of the transmission in the neutral position in at least partially unsynchronized transmissions, due to unexpected performance of the drive motor, can be prevented if a gear that can still be engaged, due to the rotational speed ratios existing between the transmission input and transmission output, is engaged fast enough.

Accordingly, the invention concerns a method for controlling an at least partially unsynchronized manual transmission, to enable the increase of a rotational speed of at least one transmission part to be synchronized during a gear changing procedure such that at least one element of the manual transmission is connected, via a shiftable clutch, to a drive motor. This drive motor provides the required rotational speed and the required torque at its output shaft.

An at least partially unsynchronized transmission should be understood herein as a shiftable transmission with several different, selectively shiftable gear ratios in which an increase of the rotational velocity of at least one transmission element is provided in at least one possible shifting procedure and in which this increase is obtained, by way of a mechanical coupling, by increasing the rotational speed of the drive motor and transferring torque from the output shaft of the drive motor to the at least one transmission element.

Expressed more simply, for example, an input of the transmission is accelerated so much by the drive motor that when shifting down from a third to a second gear, the loose wheel of the second gear and the gear shaft bearing of the loose wheel rotate with an at least approximately equal rotational speed and, therefore, a coupling, between the loose wheel and the shaft, can be made without any great jolt or high wear.

In order to attain the objective, it is provided that when the rotational speed and/or the torque, made available by the drive motor, is not sufficient to ensure synchronization of the manual transmission within a fixed time period, a shifting strategy is pursued, which prevents unintentionally holding of the transmission in its neutral position.

The decision regarding whether the rotational speed and/or the torque, made available by the drive motor, is not sufficient to ensure the synchronization of the manual transmission can be based herein on a calculation of the necessary rotational speed and a comparison with the actual rotational speed, an evaluation of a rate of change of the rotational speed, a measurement, estimate or calculation of the torque made available by the drive motor and a comparison with a fixed or estimated reference value. In these cases, monitoring is carried out to determine when the drive motor values are reached, which also allow a corresponding shifting procedure when the transmission is operational normally.

In many cases, however, it is sufficient to carry out a simple test to determine if the drive motor reacts qualitatively, as expected. The test can consist of, for example, monitoring the rotational speed curve over a fixed period of time. Herein must be merely decided, in the simplest case, if the rotational speed of the engine is above the original rotational speed by at least one predetermined absolute or relative amount, after a fixed, elapsed time period.

As an alternative, the required torque can be calculated depending upon the selected gear or the known vehicle speed or can be read from a table. It can be monitored to determine when this rotational speed is reached.

Herein, in the simplest case, the fixed time period can be a fixed value, after which a corresponding change of the drive motor values can be expected, at the latest when the drive motor functions correctly. However, the time period can be made dependent, if required, on the transmission gear to be shifted into, the temperature of the engine and/or the transmission as well as from further parameters.

In a preferred embodiment of the invention, a gear, which is still to be shifted into, is determined on the basis of the current rotational speed ratios of the input shaft and the output shaft of the manual transmission and the gear to be engaged.

By way of this method, it is possible that when the rotational speed and/or the torque made available by the drive motor is not sufficient for the planned gear change, rotation of the transmission input shaft, in the neutral position of the transmission, is nonetheless prevented. With this, it is possible, for example, to transfer the kinetic energy stored in the vehicle from the wheels, via gearing mechanisms, and a driving clutch to the drive motor and to thus support the latter for a short time and/or bring the latter into a rotational speed range in which it is still able to deliver power to the secondary consumers, such as a power steering pump, despite the defective function.

According to another embodiment of the method, it can be provided that the rotational speed window, in which the engagement of a gear is allowed, is enlarged with regard to the normal operation and in particular the engagement of a gear with a lower rotational speed of the transmission input shaft is allowed, than would be the case in the normal operation.

The shifting strategy, according to one embodiment, is not a normal operation of the vehicle, but is a strategy that makes it possible to initially continue driving, despite a considerable malfunction or at least continue driving for a short distance in order to get out of a dangerous situation. It is, therefore, justifiable to deviate from the specifications, with regard to wear and driving comfort that apply during the normal operation, in order to increase the chances for the engagement of the target gear or at least engage a gear that is close to the target gear by way of enlarging of the rotational speed window in which the engagement of a gear is allowed.

It is also advantageous when a renewed change into a higher gear, by the driver, is made at least more difficult and/or is entirely suppressed with regard to the normal operation.

When this method is activated, the driver will first notice an unusually strong shifting jolt or a perceptible shifting noise and/or an engine noise or driving behavior that is unfamiliar in comparison with similar driving situations. It stands to reason that the driver will want to correct the presumed shifting error by way of a repeated shifting procedure or to verify the unfamiliar behavior by way of a repeated shifting procedure. This can be carried out via a manual shifting command, initiated by actuation of a controller or via a manual shifting or during travel in the automatic operation by way of a corresponding actuation of the accelerator pedal or the brake pedal. This behavior is undesirable in such a situation, since a repeated shifting procedure would eventually no longer be purposefully controllable within a short time by the shifting method according to the invention.

The aggravation of the above-mentioned gear change can consist in an engagement or disengagement of the controller or the operating elements. In vehicles with fully automatic shifting transmissions, it can be provided that the rotational speed ranges or driving speed ranges of the gears can be expanded. It should always be determined, however, whether the vehicle can be decelerated and brought to a standstill without any problem.

While a gear change is thus to be prevented, the power train or the clutch can be automatically disengaged when the speed of the vehicle drops below one of several speed limits and/or the braking force exceeds a predetermined value. The speed limit can therein be absolutely fixed and can correspond in the simplest case to almost a standstill of the vehicle. Fixing of the speed limit depending upon the engaged gear and eventually further parameters seems to be more purposeful, however. The braking force can be measured, for example, via a delay sensor or braking pressure. It is particularly easy, however, to carry out the determination based on the chronological sequence of the already existing rotational speed values of the transmission output shaft or, taking into consideration the engaged gear, the rotational speed of the engine or the transmission input shaft.

In order to check if it is possible to return to normal operation and in order to prevent operation of the vehicle in a manner that can be dangerous to the engine and/or persons, according to a further embodiment, it is provided that the power train is disengaged in a secure motor vehicle operating condition. It is checked by a renewed acceleration demand on the drive motor if the drive motor reacts sufficiently for synchronization of the transmission, if there is insufficient reaction of the drive motor to the acceleration demand, a renewed startup of the vehicle is prevented.

This prevention can be absolute and can be carried out by interrupting the ignition, activating the anti-theft device or the like. However, it can also be relative and serve for the purpose of unmistakably informing the driver that he may not expect the usual driving behavior from the vehicle and that components of the vehicle may be permanently damaged with further operation or that at least an increased amount of wear must be expected.

It can also be practical to combine an absolute and a relative prevention and to limit any possible further continued driving to a limited distance or time and/or make the further operation of the vehicle dependent, for example, on the confirmation of a service message in the vehicle display, in which the driver is informed about the possible consequences of continued operation and accepts, by way of a confirmation, that the warranty will be voided for consequential damage.

Finally, it can be advantageously provided that a shifting strategy, according to an embodiment, includes shifting the transmission into the lowest possible gear. Since a low gear with a predetermined transmission output rotational speed is connected to comparatively high rotational speeds at the transmission input shaft, higher gears can be synchronized starting from a high rotational speed by decelerating the transmission input shaft and can therewith be shifted into without problem during the deceleration, via a gear brake. If the vehicle comes close to the speed limit provided for this gear, it can be shifted without problem into the next highest gear. The engine speed will also be at least within the average rotational speed range in the new gear, whereby the chances of the drive motor making available an acceptable torque are increased.

If the vehicle decelerates, instead, a premature downshift increases the chances that the rotational speed of the drive motor can be kept at a comparatively high level, despite the defective operation at low rotational speeds and can also be increased up to the synchronous rotational speed of the target gear. Insofar as it is at least possible to maintain an average rotational speed of the drive motor, it can be expected that, until the vehicle has become so slow by coasting, at least an approximate synchronous rotational speed is available.

Instead, a downshift with relatively low gear-related vehicle velocities would cause the rotational speed of the drive motor to be relatively low, when a new gear is engaged. In the error conditions observed herein in which, especially the ability of the drive motor to increase the rotational speed and to provide torque at low rotational speeds is limited, this would be very advantageous.

DETAILED DESCRIPTION OF THE INVENTION

The invention will be explained in more detail with reference to an exemplary embodiment. It is assumed, for example, that an automobile is provided with a usual internal combustion engine and an automatically shifting transmission with several discrete gears and drives in the third gear at a speed of 70 kilometers per hour. The transmission uses a brake, provided in the interior of the transmission, for slowing the transmission input to approximately a synchronization rotational speed.

In order to accelerate the transmission input during downshifting procedures, the driving clutch is automatically engaged when the transmission is shifted to neutral. The drive motor of the vehicle receives a signal to increase the rotational speed up to the desired synchronous rotational speed from the transmission control, via the engine control. When the synchronous rotational speed has been reached, the gear is engaged.

Traveling uphill, the transmission control transmits, in addition, a signal to the corresponding actuators to shift into the second gear. For this purpose, the transmission is first brought into the neutral position, the driving clutch, between the engine and the transmission, is then engaged and a signal is transmitted to the engine to increase the rotational speed up to the synchronous rotational speed. Since, in this exemplary case, however, a technical defect in regard to the engine or the engine control is present, the engine runs irregularly in idle or without load and would come to a standstill within a few minutes. An increase of the rotational speed while in this operating condition is not possible and the reducible torque at the crankshaft is minimal.

Because the vehicle is equipped, according to the invention, with an adjustment or control, the transmission control monitors the characteristic of the engine rotational speed, after the signal, that the engine rotational speed should be increased, has been released and determines after an appropriate time period that an increase of the engine rotational speed has not yet been registered.

The control strategy is then activated, according to the invention, and it is determined, with the aid of a threshold value table, which gears can still be shifted into given the present available rotational speeds at the input shaft and output shaft of the transmission without having to increase the rotational speed of the input shaft by way of engine power. More expanded rotational speed windows are established in this way for the synchronization than would be the case in a normal operation.

In this case, a comparatively large deviation from the synchronous rotational speed is permitted. Based on these marginal conditions, it is determined that it is possible to again engage the third gear, because of the expanded rotational speed window. This is then also carried out. The vehicle drives again in the third gear and the engine is passively able to deliver power to the accessories, for example, a power steering pump, after it has been accelerated again via the centrifugal mass of the vehicle.

Because the vehicle is, however, on an uphill, the driver expects a downshifting operation. In addition the driver has also recognized the change into the neutral position of the transmission, as well as the renewed engagement of the third gear, from jerking and has also acoustically recognized an engine noise and automatically steps on the accelerator pedal in order to force the interrupted gear change. This is prevented, however, by the control, since a renewed shifting attempt could cause the vehicle to drive so slowly that the re-engagement of the third gear might no longer be possible.

At the next stop of the vehicle, the transmission is automatically brought into its neutral position and a restart is prevented. For testing purposes, however, a signal that the engine rotational speed should be increased is transmitted to the engine control by the transmission control unit. Since the motor rotational speed is then not increased as expected, normal operation cannot be recovered. The driver is provided with a conclusive error description on the multi-functional display. He can, however, start the car anew and set it into operation, if he previously confirms, by pressing a confirmation key, that he has acknowledged that doing so can cause further damage to the drive motor and produce an increased wear on the transmission. In this way, he can travel the relatively short distance to the next shop without having to be towed.

The invention claimed is:

1. A method of controlling an at least partially unsynchronized manual transmission in a vehicle power train connected from a drive motor to increase a rotational speed of a transmission part to be synchronized during a gear change procedure, the method comprising the steps of:
   connecting at least one transmission element, via a shiftable clutch, to a drive motor;
   making available to the drive motor a required rotational speed and a necessary torque at an output shaft of the drive motor; and
   if at least one of the required rotational speed and the necessary torque made available by the drive motor is insufficient to ensure synchronization of the manual transmission within a fixed time period, initiating a shifting strategy which prevents an unintentional retention of the manual transmission in a neutral position, and the shifting strategy including:
   disengaging a power train if, within the shifting strategy, at least one of a speed of a vehicle falls below a speed limit and a braking force exceeds a predetermined value.

2. A method of controlling an at least partially unsynchronized manual transmission in a vehicle power train connected from a drive motor to increase a rotational speed of a transmission part to be synchronized during a gear change procedure, the method comprising the steps of:
   connecting at least one transmission element, via a shiftable clutch, to a drive motor;
   making available to the drive motor a required rotational speed and a necessary torque at an output shaft of the drive motor; and
   if at least one of the required rotational weed and the necessary torque made available by the drive motor is insufficient to ensure synchronization of the manual transmission within a fixed time period, initiating a shifting strategy which prevents an unintentional retention of the manual transmission in a neutral position, and the shifting strategy including:
   disengaging the power train in a safe vehicle operating location, and checking, by reaccelerating the drive motor, if reaccelerating the drive motor enables synchronization of the transmission, and preventing further starting of a vehicle when there is an insufficient reaction to reaccelerating of the drive motor.

3. A method for controlling a gear change procedure in an at least partially unsynchronized manual transmission in a vehicle drive train wherein the gear change procedure requires at least one of an increase in a rotational speed and an input torque of a first element of the transmission, the method comprising the steps of:
   connecting a first element of the transmission, via a clutch, to a drive motor of the drive train;
   attempting to increase the at least one of the rotational speed and input torque of the first element of the transmission by increasing at least one of the output rotational speed of the drive motor and the output torque of the drive motor to provide at least one of a rotational speed and an input torque to the first element of the transmission sufficient to synchronize the at least one of the rotational speed and the input torque of the first element with at least one of a rotational speed and a torque of a second element of the transmission; and
   when the at least one of the rotational speed and the torque of the first element is insufficient to synchronize with the at least one of a rotational speed and a torque of the second element of the manual transmission within a fixed time period, initiating a shifting strategy which prevents an unintentional retention of the manual transmission in a neutral position.

4. The method according to claim 3, further comprising the step of determining a shiftable gear based on current rotational speed ratios of an input shaft and an output shaft of the manual transmission and engaging this gear based upon the shifting strategy.

5. The method according to claim 3, further comprising the step of increasing a rotational speed window, within which engagement of a gear is allowed, with regard to the rotational speed window for during normal operation.

6. The method according to claim 3, further comprising the step of at least one of:
   making it difficult for a driver to make a further gear change, and
   completely preventing the driver to make a further gear change, with regard to a gear change during normal operation within this shifting strategy.

7. The method according to claim 3, further comprising the step of shifting the transmission into a lowest possible gear.

* * * * *